UNITED STATES PATENT OFFICE.

JOHN H. STEVENS, OF NEWARK, AND FRANK C. AXTELL, OF SHORT HILLS, NEW JERSEY, ASSIGNORS TO THE CELLULOID COMPANY, OF NEW YORK, N. Y., A CORPORATION OF NEW JERSEY.

PYROXYLIN COMPOUND.

SPECIFICATION forming part of Letters Patent No. 610,728, dated September 13, 1898.

Application filed May 16, 1898. Serial No. 680,838. (No specimens.)

*To all whom it may concern:*

Be it known that we, JOHN H. STEVENS, of the city of Newark, county of Essex, and State of New Jersey, and FRANK C. AXTELL, of Short Hills, in the said county and State, have invented certain new and useful Improvements in Pyroxylin Compounds, of which the following is a specification.

The special class of compounds to which this specification refers are made by dissolving pyroxylin in solvents of the same. The solutions vary in consistency from thin liquids down to plastic solids, according to the purpose for which the compounds are to be used, as is well understood. The thin liquids are for lacquers and varnishes. The solutions of medium fluidity are used for spreading and coating purposes, and the solids are masticated in rolls or formed in dies or other machinery and finally employed in the form of rods, tubes, blocks, and molded or cut articles.

The necessities of the art demand a large number of solvents of varying individual characteristics. Solvents such as amyl acetate, the usefulness of which will be found described in United States Patent No. 269,340, issued to John H. Stevens, one of the present inventors, depend to a large extent upon the peculiar properties residing in them, which properties they impart to the compounds made by their aid. The valuable properties of amyl acetate are its slow volatility and immiscibility with water. These properties cause it to be largely used in such compounds as require to be evaporated down to a smooth non-hygroscopic film. Wood spirit and acetone are examples of solvents which, though powerful and useful in many respects, are nevertheless deficient in these special properties possessed by amyl acetate. A mixture of ether and alcohol is an example of a mixed solvent of active properties which lies midway between such solvents as amyl acetate and wood spirit. This is largely due to the fact that ether is insoluble in water. As only a small quantity of alcohol is necessary to form a solvent with the ether, it is possible with this ether-alcohol solvent to make pyroxylin compounds possessing to a certain extent this non-hygroscopic property; but the extreme volatility of the ether causes a chilling of the pyroxylin compound during the evaporation of the ether, which results in a deposition of moisture from the atmosphere. This effect makes ether almost as objectionable to use as volatile solvents miscible with water, and yet the ether-alcohol is a valuable solvent, all of which illustrates the fact we have already pointed out as to the necessity of a great variety of solvent substances to select from.

The object of the present invention is to extend the list of known solvents and is based on the discovery that the esters of carbonic acid can be successfully used in solvent mixtures for pyroxylin. There are various methods of forming a carbonic ester, among which are the following:

First. The most practicable method consists in acting on an alcohol with a chloroformic ester. For instance, by acting on ethylic alcohol with ethylic chloroformate the product of the reaction is diethylic carbonate.

Second. Another process consists in acting on the esters of oxalic acid with sodium or potassium. (See Beilstein's *Handbuch der Organischen Chemie*, 3d ed., Vol. I, p. 541.)

While our experiments show that all the esters of carbonic acid are more or less useful in pyroxylin compositions, yet for practical purposes we prefer the use of the esters formed by uniting carbonic acid with the aliphatic series of alcohols beginning with methyl alcohol and ending with amyl alcohol, the entire group being methyl, ethyl, propyl, butyl, and amyl alcohols. The alcoholic esters so produced present a great variety in desirable properties. The carbonate of methyl, for instance, is highly volatile, yet practically immiscible with water, while the amyl ester is of slow volatility, somewhat resembling amyl acetate. These esters are also free from the objectionable odor possessed by amyl acetate. This odor has limited the employment of amyl acetate in many applications in which it was otherwise very useful. We find that while in an absolutely pure state these esters possess little or no active solvent power on pyroxylin, nevertheless the presence of a very small amount of alcohol renders them active. As ordinarily produced the by-products which are present in them are often sufficient to impart active solvent properties. Nor does the use of alcohol prevent these esters from exhibiting the usefulness of their non-hygroscopic and other properties. The best illustration of this property is the action of ether and alcohol as solvents, the ether being a well-known non-solvent until mixed with the alcohol and yet capable of many useful effects.

The art of manufacturing pyroxylin compounds is too well known to need any particular description. We select the esters for use according to the requirements of the compound to be made—that is, for quick-drying compounds we take, preferably, one of the methyl esters and for extremely-slow-drying compounds an amyl ester. The individual esters can be mixed in order to obtain any desired effect. The pyroxylin can either be dissolved in these esters, aided by a little alcoholic solvent, or the ester can be used in combination with other well-known solvents, it now being generally understood that the nature of the pyroxylin compound, other things being equal, depends upon the characteristics of the solvent or solvent mixture.

Having fully described our invention, what we claim, and desire to secure by Letters Patent, is—

1. A pyroxylin composition of matter containing pyroxylin and an ester of carbonic acid, substantially as described.

2. A composition of matter containing pyroxylin, a solvent of pyroxylin, and an ester of carbonic acid, substantially as described.

JOHN H. STEVENS.
FRANK C. AXTELL.

Witnesses:
WALTER P. LINDSLEY,
S. M. COOLEY.